US012703001B2

(12) United States Patent
Ueno et al.

(10) Patent No.: US 12,703,001 B2
(45) Date of Patent: Aug. 11, 2026

(54) NOZZLE, COATING DEVICE, AND COATING METHOD

(71) Applicant: TERUMO KABUSHIKI KAISHA, Tokyo (JP)

(72) Inventors: Takashi Ueno, Fujinomiya-city (JP); Shinjiro Kitada, Fujinomiya-city (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 62 days.

(21) Appl. No.: 18/447,418

(22) Filed: Aug. 10, 2023

(65) Prior Publication Data

US 2023/0381806 A1 Nov. 30, 2023

Related U.S. Application Data

(63) Continuation of application No. PCT/JP2022/007822, filed on Feb. 25, 2022.

(30) Foreign Application Priority Data

Mar. 25, 2021 (JP) ................................ 2021-050970

(51) Int. Cl.
*B05C 11/10* (2006.01)
*B05C 3/10* (2006.01)
(Continued)

(52) U.S. Cl.
CPC ............ *B05C 11/1047* (2013.01); *B05C 3/10* (2013.01); *B05C 3/132* (2013.01); *B05C 5/027* (2013.01);
(Continued)

(58) Field of Classification Search
None
See application file for complete search history.

(56) References Cited

U.S. PATENT DOCUMENTS 6,203,551 B1 * 3/2001 Wu .......................... A61F 2/06 606/1
2012/0100279 A1 4/2012 Neumann et al.
2014/0060973 A1 * 3/2014 Singer ...................... B05C 1/04 184/15.1

FOREIGN PATENT DOCUMENTS

JP 2009501056 A 1/2009
JP 2012529945 A 11/2012
(Continued)

OTHER PUBLICATIONS

English Translations of the International Search Report (Form PCT/ISA/210) and the Written Opinion of the International Searching Authority (Form PCT/ISA/237) issued Apr. 5, 2022, by the Japan Patent Office in corresponding International Application No. PCT/JP2022/007822. (5 pages).
(Continued)

*Primary Examiner* — Binu Thomas
(74) *Attorney, Agent, or Firm* — Buchanan Ingersoll & Rooney PC

(57) ABSTRACT

A nozzle, a coating device, and a coating method are able to selectively and easily apply a coating liquid to desired portion of a medical elongated body. The nozzle includes a nozzle distal portion that is provided with a holding space in which a coating liquid to be applied to a shaft can be held, and a nozzle main body portion that is provided with a lumen through which the coating liquid is delivered to the nozzle distal portion, and an opening portion via which the lumen and the holding space communicate with each other.

10 Claims, 10 Drawing Sheets

(51) Int. Cl.
*B05C 3/132* (2006.01)
*B05C 5/02* (2006.01)
*B05C 13/02* (2006.01)
*B05D 7/20* (2006.01)
*B05C 9/02* (2006.01)

(52) U.S. Cl.
CPC ................ *B05C 13/02* (2013.01); *B05D 7/20* (2013.01); *B05C 5/0241* (2013.01); *B05C 9/02* (2013.01); *B05D 2256/00* (2013.01)

(56) References Cited

FOREIGN PATENT DOCUMENTS

| | | | | |
|---|---|---|---|---|
| JP | 2014042876 | A | * | 3/2014 |
| JP | 2015009095 | A | | 1/2015 |
| JP | 2015119804 | A | | 7/2015 |
| JP | 2015195961 | A | | 11/2015 |
| JP | 2018153289 | A | | 10/2018 |

OTHER PUBLICATIONS

International Search Report (PCT/ISA/210) with English translation and Written Opinion (PCT/ISA/237) mailed on Apr. 5, 2022, by the Japanese Patent Office as the International Searching Authority for International Application No. PCT/JP2022/007822.

* cited by examiner

NOZZLE, COATING DEVICE, AND COATING METHOD

CROSS-REFERENCES TO RELATED APPLICATIONS

This application is a continuation of International Patent Application No. PCT/JP2022/007822 filed on Feb. 25, 2022, which claims priority to Japanese Patent Application No. 2021-050970 filed on Mar. 25, 2021, the entire content of both of which is incorporated herein by reference.

TECHNOLOGICAL FIELD

This disclosure generally relates to a nozzle, a coating device, and a coating method that apply a coating liquid to a medical elongated body.

BACKGROUND DISCUSSION

Various kinds of coating liquids are applied in some case to medical elongated bodies (for example, shafts) that are constituent members or parts of medical devices such as a catheter and a guide wire in accordance with product specifications.

In many cases, the medical elongated body has a construction in which a plurality of members are combined by a method such as heat-welding. At this time, when the member applied with the coating liquid is welded, the welding intensity decreases in some cases. In that case, in order to prevent a decrease in the welding intensity in a welded part, after the member is subjected to the coating, the coating is sometimes removed only from the welded part, and another member is welded thereto.

In the manufacturing method as described above, the manufacturing work has been cumbersome because of an increased step of partially removing the coating. For the abovementioned problem, it can be considered that if it becomes possible to selectively apply the coating liquid to an arbitrary portion of the medical elongated body, for example, the manufacturing work can be prevented from becoming cumbersome. As one example of a device that implements such a manufacturing method, Japanese Patent Application Publication No. 2009-501056 (JP2009-501056A) discloses a nozzle capable of applying a coating liquid to a part of a medical elongated body.

SUMMARY

However, the nozzle described in Japanese Patent Application Publication No. 2009-501056 includes a jet-type nozzle that blows the coating liquid on the medical elongated body. Accordingly, it is not easy to accurately apply the coating liquid only to the arbitrary portion of the medical elongated body. Thought may be given to providing the medical elongated body with masking or the like, by dividing the medical elongated body into an application region and a non-application region of the coating liquid, so that the coating liquid can be accurately applied. However, the steps associated with providing and removing the masking become necessary, so that it is difficult to prevent the manufacturing work from becoming cumbersome.

This nozzle, coating device, and coating method disclosed here can selectively and easily apply a coating liquid to an arbitrary or desired portion of a medical elongated body.

The nozzle disclosed here includes: a nozzle distal portion including a holding space capable of holding a coating liquid to be applied to a medical elongated body; and a nozzle main body portion including a lumen through which the coating liquid is delivered to the nozzle distal portion, and an opening portion via which the lumen and the holding space communicate with each other.

Moreover, a coating device for coating a medical elongated body comprises a nozzle comprised of a nozzle main body portion and a nozzle distal portion. The nozzle main body portion possesses a distal end at which is located the nozzle distal portion, and the nozzle distal portion is located at the distal end of the nozzle main body. The nozzle distal portion includes a holding space to hold a coating liquid to be applied to a medical elongated body that extends in an axial direction. The nozzle main body portion includes a lumen through which the coating liquid is delivered to the nozzle distal portion. The nozzle main body includes an opening portion that communicates with the lumen and opens into the holding space. The coating device also includes a movement mechanism that controls movement of the nozzle and/or the medical elongated body so that the coating liquid is applied to an axial portion of the medical elongated body by relatively moving, in a state where a part of the medical elongated body is disposed in the holding space, the nozzle and the medical elongated body along the axial direction of the medical elongated body.

Moreover, a coating method for applying a coating liquid to a medical elongated body includes applying the coating liquid to an arbitrary portion in an axis direction of the medical elongated body by relatively moving, in a state where the medical elongated body is brought into contact with the coating liquid held in a nozzle distal portion that is included in a nozzle, the nozzle and the medical elongated body along the axis direction of the medical elongated body.

The nozzle, coating device, and coating method disclosed here makes it possible to selectively and easily apply a coating liquid to an arbitrary portion of a medical elongated body.

DETAILED DESCRIPTION

Figure 1:
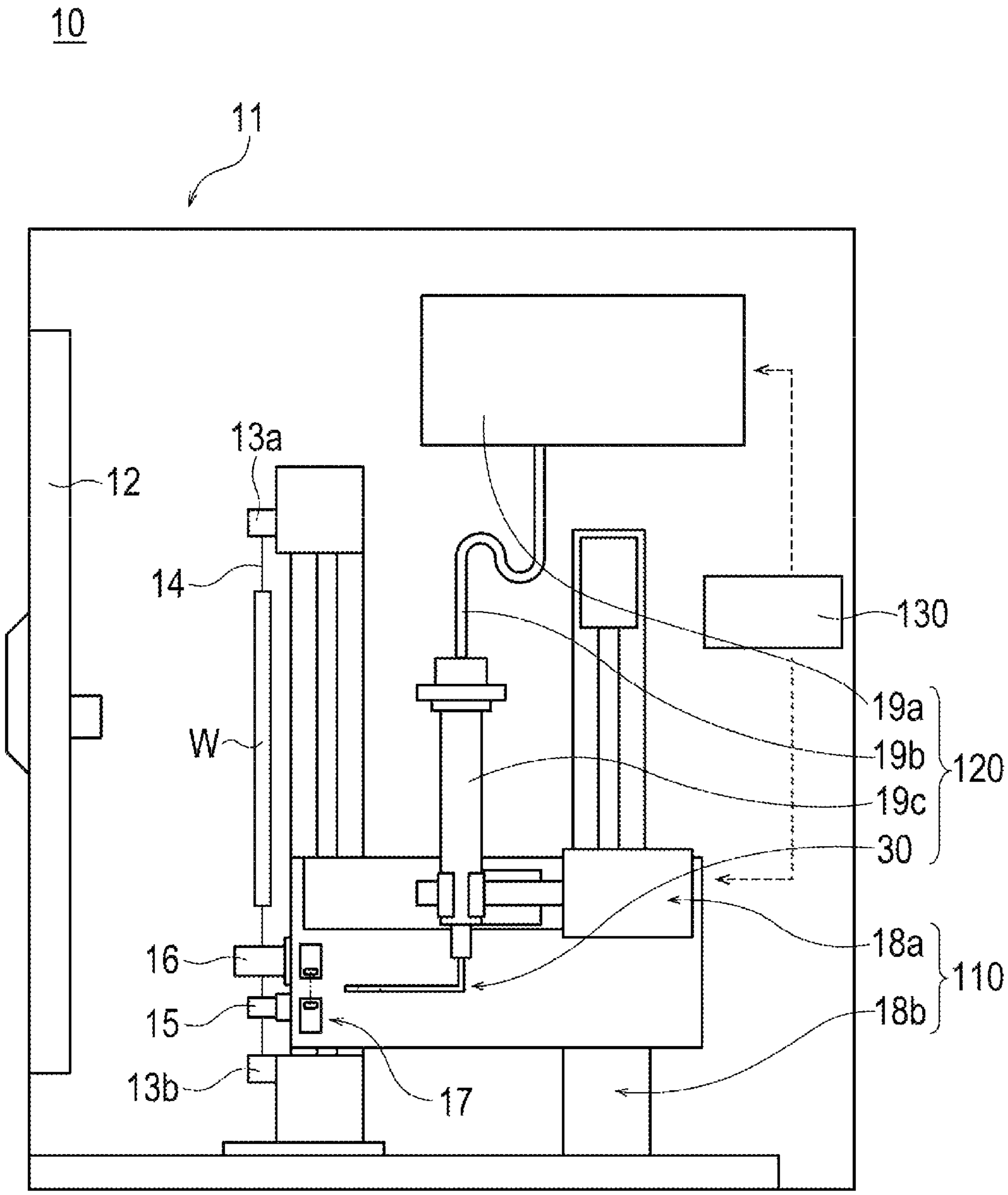
FIG. 1 is a view illustrating an entire configuration of a coating device according to an embodiment.

Set forth below with reference to the accompanying drawings is a detailed description of embodiments of a nozzle, a coating device and a coating method representing examples of the new nozzle, coating device, and coating method disclosed here. The following description does not limit the technical scope described in the claims and the meaning of terms. Moreover, the size ratios in the drawings may be exaggerated for convenience of explanation and may be different from the actual ratios in some cases.

FIG. 1 is a view illustrating an overall configuration of a coating device 10 that is provided with a nozzle 30 according to the present embodiment. FIGS. 2 to 5 illustrate the configuration of the nozzle 30. FIGS. 6 to 11 illustrate a coating method of a coating liquid C by using the nozzle 30.

The present embodiment exemplifies a shaft (hereinafter, simply referred to as a "shaft W") of a catheter, as a medical elongated body (workpiece) W that is an object to be coated with the coating liquid C. But the object to be coated is not limited to a shaft of a catheter.

<Coating Device>

Figure 2:
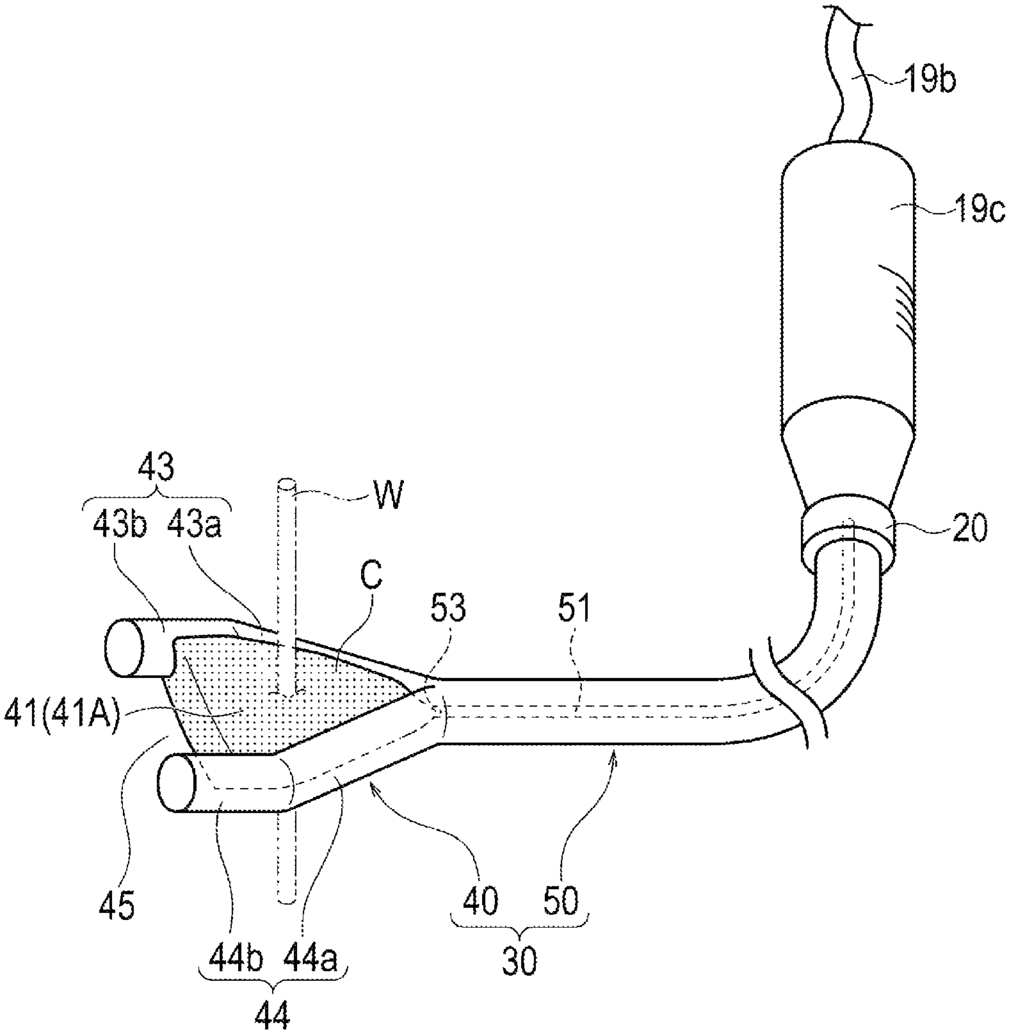
FIG. 2 is a perspective view of a nozzle according to the embodiment.

As illustrated in FIGS. 1 and 2, the coating device 10 includes a chamber 11 that is provided with a working space in which the coating liquid C is applied to the shaft W.

The chamber 11 includes an opening and closing door 12 that partitions an inside and an outside of the chamber 11, an upper-side workpiece setting table 13*a* and a lower-side workpiece setting table 13*b* on which the shaft W is set, a core bar (jig) 14 that is inserted through the shaft W, a workpiece guide 15 that guides the shaft W, an outer diameter measuring instrument 16 that measures an outer diameter of the shaft W, droplet check sensors 17 for checking a held state of the coating liquid C in a nozzle distal portion 40, a movement mechanism 110 that controls movement of the nozzle 30, a coating liquid supply mechanism 120 that executes an application of the coating liquid C to the shaft W, and a control unit 130 that executes operation control of each unit in the coating device 10.

The opening and closing door 12 can include a door of an electromagnetic lock type, for example.

The upper-side workpiece setting table 13*a* and the lower-side workpiece setting table 13*b* can hold and fix the shaft W. When the shaft W is set to the respective workpiece setting tables 13*a* and 13*b*, by inserting the core bar 14 through a lumen (illustration is omitted) of the shaft W, the shaft W can be prevented from being broken or warped. The workpiece guide 15 guides (supports) the shaft W at the lower-side workpiece setting table 13*b* side.

The outer diameter measuring instrument 16 measures the outer diameter of the shaft W to which the coating liquid C has been applied. The outer diameter measuring instrument 16 measures the outer diameter of the shaft W to detect a thickness of the coating liquid C applied to the shaft W. Moreover, the outer diameter measuring instrument 16 determines whether the coating liquid C with a suitable thickness is applied to the shaft W.

When the coating liquid C is applied to the shaft W, the droplet check sensor 17 detects whether the coating liquid C is held in the nozzle distal portion 40. The droplet check sensors 17 can include, for example, laser detectors that emit laser light toward the nozzle 30 when the nozzle 30 passes between the droplet check sensors 17, and check whether the coating liquid C is present based on a passage situation of the laser light.

The movement mechanism 110 includes a linear actuator 18*a* for a front-and-rear operation that causes the nozzle 30 to approach and separate from the respective workpiece setting tables 13*a* and 13*b* to which the shaft W is set, and a linear actuator 18*b* for an up-and-down operation that moves the nozzle 30 along an axis direction (up-and-down direction in the drawing) of the shaft W set to the respective workpiece setting tables 13*a* and 13*b*.

The coating device 10 causes the respective linear actuators 18*a* and 18*b* in the movement mechanism 110 to operate in the manner discussed below to execute the application of the coating liquid C to the shaft W.

Figure 7:
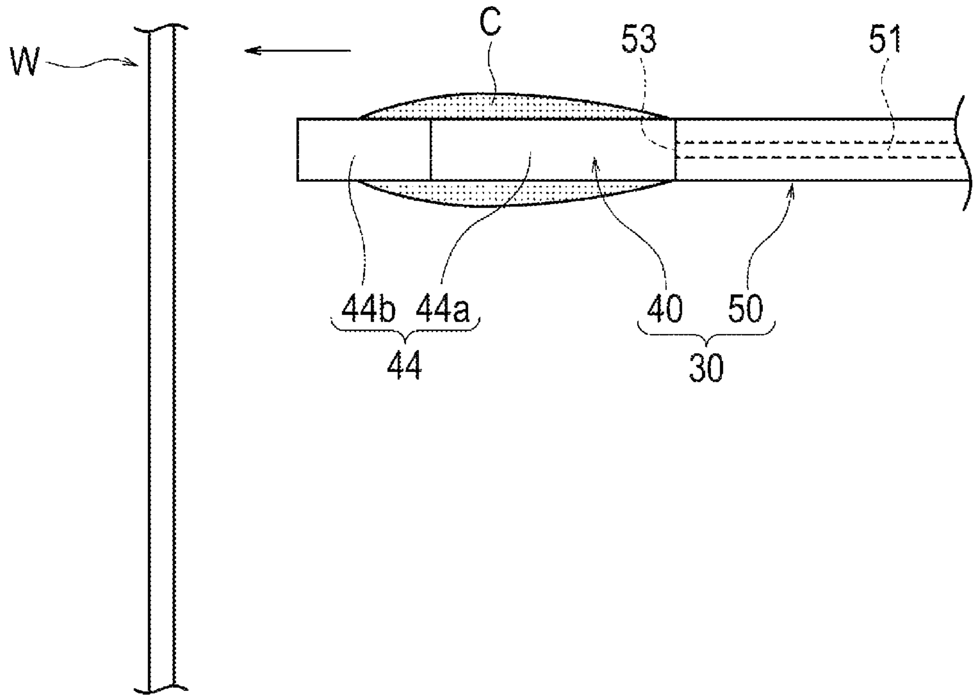
FIG. 7 is a view for explaining the coating method according to the embodiment.

When the application of the coating liquid C by using the nozzle 30 is started, the coating device 10 causes the nozzle 30 to approach the shaft W by way of the linear actuator 18*a* for the front-and-rear operation or movement (see FIG. 7). The coating device 10 moves the nozzle 30 along the axis direction of the shaft W by way of the linear actuator 18*b* for the up-and-down operation or movement, in a state where the shaft W is brought into contact with the coating liquid C held in the nozzle 30. Accordingly, the coating liquid C can be applied to the shaft W (see FIGS. 8 and 9). After the application of the coating liquid C by using the nozzle 30 has been completed, the coating device 10 causes the nozzle 30 to separate from the shaft W by way of the linear actuator 18*a* for the front-and-rear operation (see FIG. 11). In the coating device 10, the shaft W can be configured to be able to relatively approach toward the nozzle 30, and the nozzle 30 and the shaft W can be configured to be movable along the axis direction (axial direction) of the shaft W.

The coating liquid supply mechanism 120 includes a dispenser 19*a* that holds the coating liquid C of a predetermined amount, a tube 19*b* connected to the dispenser 19*a*, a syringe 19*c* connected to the dispenser 19*a* via the tube 19*b*, and the nozzle 30 connected to the syringe 19*c*.

When the application of the coating liquid C is started, the coating device 10 delivers the coating liquid from the dispenser 19*a* to the syringe 19*c* in response to an instruction (an input of a work content or operation parameters, and the like) from an operator. Moreover, the coating device 10 controls the operation of the syringe 19*c* to control a supply amount of the coating liquid C to be supplied to the nozzle 30. In the present embodiment, the dispenser 19*a* is configured to be able to execute a liquid delivery operation in which the coating liquid C is supplied from the dispenser 19*a* to the nozzle 30, and an aspiration operation in which the coating liquid C supplied to the nozzle 30 is returned to the dispenser 19*a*.

The control unit 130 can include a microcomputer including a CPU, a RAM, a ROM, and the like. The control unit 130 controls operations of the respective units of the coating device 10 in an integrated manner. The CPU included in the control unit reads various kinds of programs stored in the ROM in advance on the RAM and executes the programs, so that predetermined processing is executed. Moreover, the control unit 130 also functions as a storage unit that stores various kinds of setting information and control programs, and a calculating unit that executes calculation of the liquid delivery amount of the coating liquid C or the like.

<Nozzle>

As illustrated in FIGS. 2, 3, 4, and 5, the nozzle 30 includes the nozzle distal portion 40, and a nozzle main body portion 50.

The nozzle distal portion 40 is provided with a holding portion 41 capable of holding the coating liquid C to be applied to the shaft W.

The nozzle main body portion 50 is provided with a lumen 51 through which the coating liquid C is delivered to the nozzle distal portion 40, and an opening portion (opening) 53 via which the lumen 51 and the holding portion 41 communicate with each other.

The lumen 51 of the nozzle main body portion 50 communicates with the syringe 19*c*. The coating liquid C supplied to the nozzle distal portion 40 through the syringe 19*c* and the nozzle main body portion 50 is guided to the holding portion 41 via the opening portion 53. As illustrated in FIG. 2, a liquid leakage prevention valve can be disposed to a connection portion between the nozzle main body portion 50 and the syringe 19*c*.

The nozzle 30 is configured to be able to aspirate the coating liquid C held by the holding portion 41 and the coating liquid C applied to the shaft W, via the opening portion 53 and the lumen 51 of the nozzle main body portion 50 (see FIG. The control unit 130 (see FIG. 1) can control switching between the application operation of the coating liquid C and the aspiration operation of the coating liquid by the nozzle 30.

The nozzle distal portion 40 includes a first bifurcated portion 43 and a second bifurcated portion 44 bifurcated at a distal side of the nozzle main body portion 50.

Figure 3:
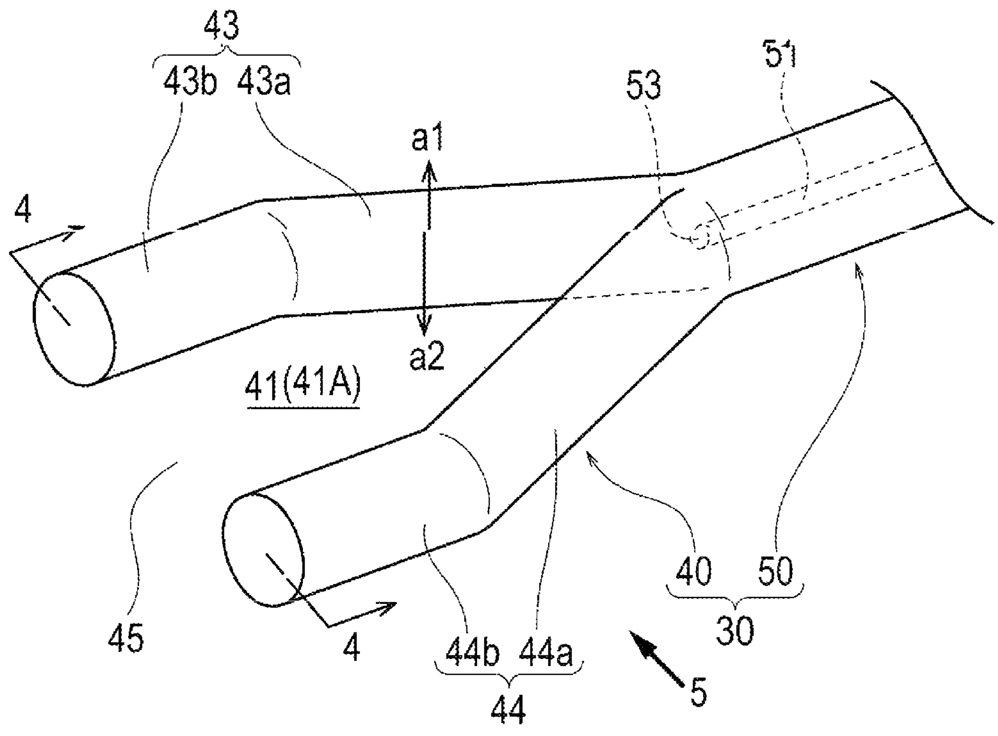
FIG. 3 is a perspective view of a nozzle distal portion and a nozzle main body portion according to the embodiment.

A holding space 41A that forms the holding portion 41 is sectioned or positioned between the first bifurcated portion 43 and the second bifurcated portion 44. The holding space 41A communicates with an outside of the holding space 41A in a direction (direction illustrated by an arrow a1-a2 in FIG. 3) orthogonal to an extending direction of each of the bifurcated portions 43 and 44. That is, as shown in FIG. 3, the holding space 41A communicates with outside the holding space 41A in a direction orthogonal to the plane in which the bifurcated portions 43, 44 lie. The nozzle distal portion 40 can hold the coating liquid C supplied via the opening portion 53, in the holding space 41A (gap) between the first bifurcated portion 43 and the second bifurcated portion 44, by a surface tension of the coating liquid C.

The first bifurcated portion 43 includes a first part 43*a* that extends so as to separate from the nozzle main body portion 50, and a second part 43*b* that substantially linearly extends from a distal end of the first part 43*a*.

The second bifurcated portion 44 includes a first part 44*a* that extends so as to separate from the nozzle main body portion 50, and a second part 44*b* that substantially linearly extends from a distal end of the first part 44*a*.

The first part 43*a* of the first bifurcated portion 43 and the first part 44*a* of the second bifurcated portion 44 substantially symmetrically extend in directions separating from each other (diverging away from one another) with reference to the opening portion 53. The second part 43*b* of the first bifurcated portion 43 and the second part 44*b* of the second bifurcated portion 44 extend substantially parallel to each other with a predetermined interval or space therebetween.

As illustrated in FIGS. 2 and 3, the nozzle distal portion 40 includes an insertion portion 45 that allows the insertion of the shaft W from a distal side of the nozzle distal portion 40 into the holding portion 41.

The insertion portion 45 includes a gap formed between a distal end of the first bifurcated portion 43 and a distal end of the second bifurcated portion 44.

Figure 4:
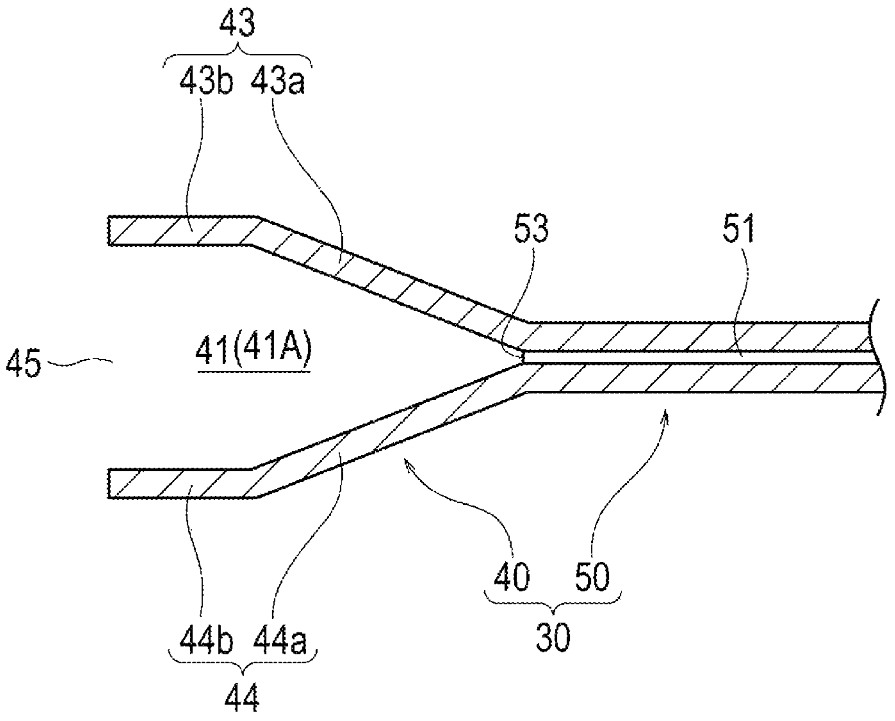
FIG. 4 is a cross-sectional view of the nozzle along the section line 4-4 in FIG. 3.
Figure 5:
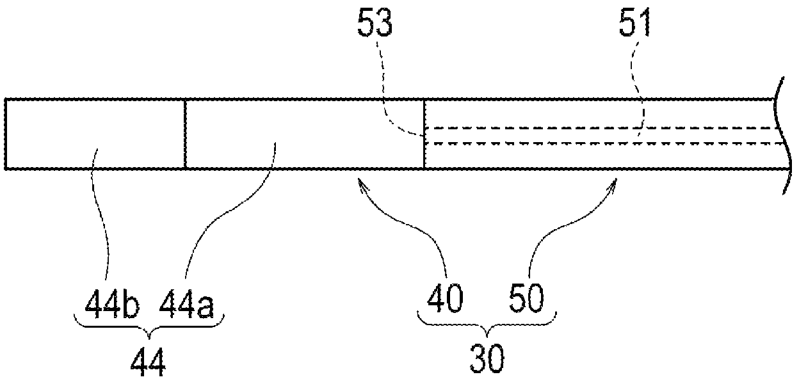
FIG. 5 is a side view of the nozzle seen from an arrow 5 direction in FIG. 3.
Figure 10:
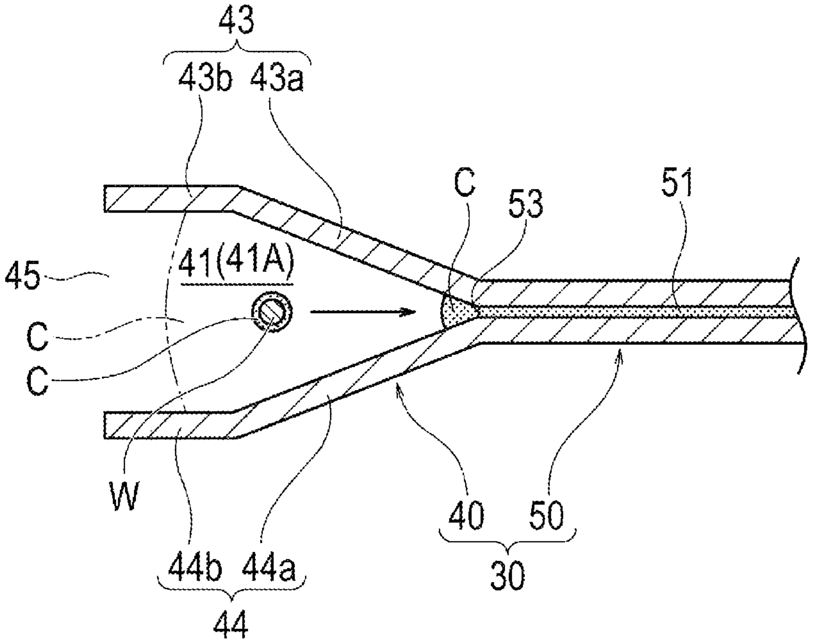
FIG. 10 is a view for explaining the coating method according to the embodiment.

The nozzle distal portion 40 includes the first bifurcated portion 43, the second bifurcated portion 44, and the insertion portion 45, thereby having a planar shape of a substantially Y-character shape (see FIGS. 4 and 10).

The respective bifurcated portions 43 and 44 of the nozzle distal portion 40 extend such that the gap therebetween gradually expands from the nozzle main body portion 50 side. That is, the distance between the bifurcated portions 43 and 44 of the nozzle distal portion 40 gradually increases along at least a portion of the bifurcated portions 43, 44. The coating liquid C supplied from the opening portion 53 gradually spreads out to the respective second parts 43*b* and 44*b* along the respective first parts 43*a* and 44*a* in which a gap therebetween is narrower. Accordingly, the nozzle distal portion 40 can hold the coating liquid C in the comparatively narrow gap immediately after the coating liquid C has been supplied from the opening portion 53. Accordingly, the nozzle distal portion 40 can suitably hold the coating liquid C in the holding space 41A formed between the respective bifurcated portions 43 and 44, by the surface tension of the coating liquid C.

As for a material that constitutes the nozzle 30 (the nozzle distal portion 40 and the nozzle main body portion 50), for example, stainless steel can be used.

The type of the coating liquid C is not specially limited, and in a case where the shaft W is used as a constituent member of a catheter, for example, a fluorine resin can be used. The viscosity of the coating liquid C can be adjusted in accordance with the size, the shape, the area, and the like of the holding portion 41 that is formed between the first bifurcated portion 43 and the second bifurcated portion 44.

Next, a coating method of the coating liquid C by using the coating device 10 and the nozzle 30 will be described.

Figure 6:
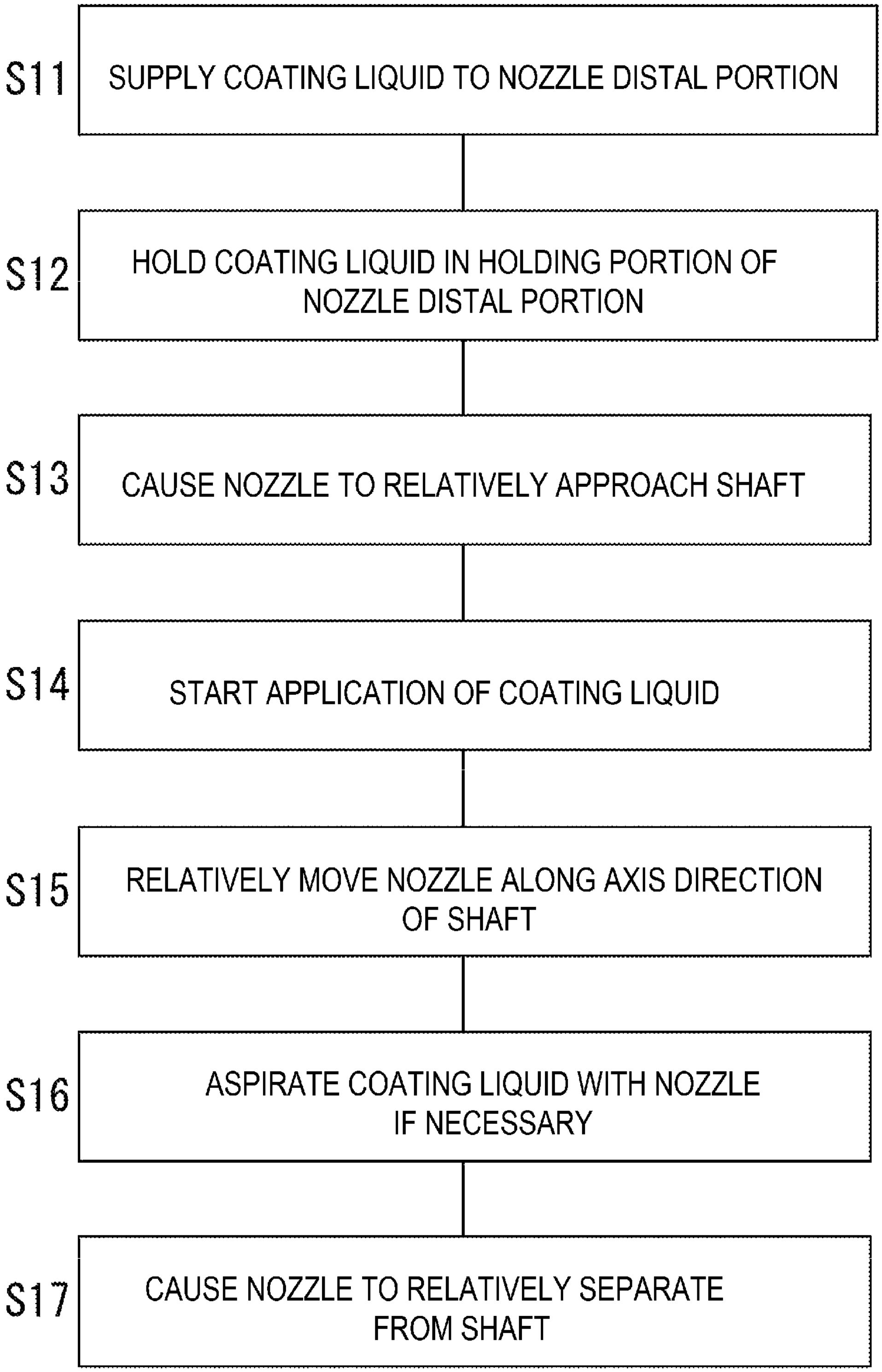
FIG. 6 is a flowchart illustrating respective steps of a coating method according to the embodiment.

FIG. 6 schematically illustrates respective steps in the coating method of the coating liquid C as a flowchart.

As illustrated in FIG. 6, the coating method of the coating liquid C includes supplying the coating liquid C to the nozzle distal portion 40 (S11), holding the coating liquid C in the holding portion 41 (the holding space 41A) of the nozzle distal portion 40 (S12), causing the nozzle 30 to relatively approach the shaft W (S13), starting the application of the coating liquid C (S14), relatively moving the nozzle 30 along the axis (axial) direction of the shaft W (S15), aspirating the coating liquid C with the nozzle 30 if necessary (S16), and causing the nozzle 30 to relatively separate from the shaft W (S17). Hereinafter, the respective steps will be described.

An operator controls operation of the coating device through appropriate input to control the application of the coating liquid C to the shaft W so that, as shown in FIG. 2, the coating liquid C is supplied to the nozzle distal portion 40. The holding portion 41 formed in the nozzle distal portion 40 holds the coating liquid C.

As illustrated in FIG. 7, in a state where the holding portion 41 is caused to hold the coating liquid C (i.e., when the holding portion 41 is holding the coating liquid C), the control unit, through operation by the operator, causes the nozzle 30 to approach the shaft W so that the nozzle 30 moves toward the shaft W. Herein, the nozzle 30 is moved to approach the shaft W, however, the shaft W may be moved to approach the nozzle 30 or both of the nozzle 30 and the shaft W may be moved to approach each other.

Figure 8:
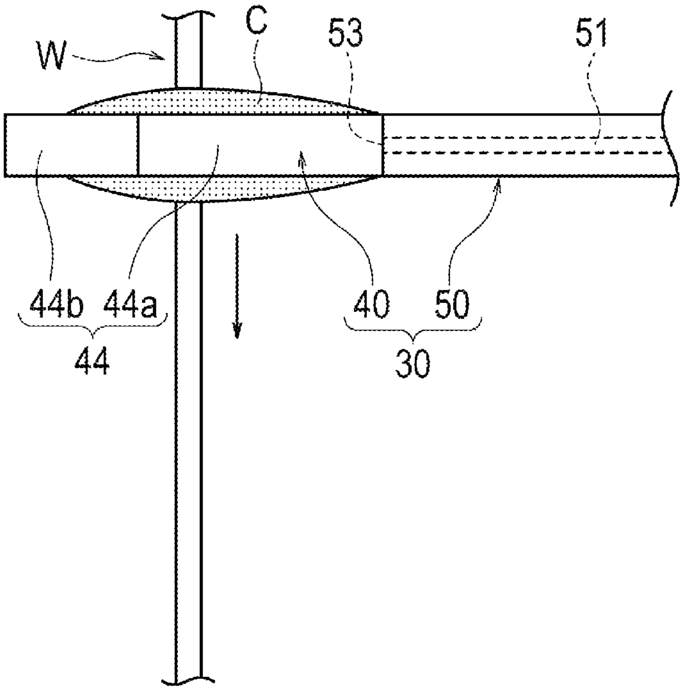
FIG. 8 is a view for explaining the coating method according to the embodiment.

As illustrated in FIG. 8, the control unit, through the operator's control of the coating device, brings the coating liquid C held in the holding portion 41 into contact with the shaft W to start the application of the coating liquid C to the shaft W. The insertion portion 45 that allows the insertion of the shaft W into the holding portion 41 is formed in the nozzle distal portion 40 (see FIGS. 2 and 3)

Accordingly, the nozzle 30 is caused to relatively approach the shaft W, so that the shaft W can be easily disposed inside the holding portion 41.

Figure 9:
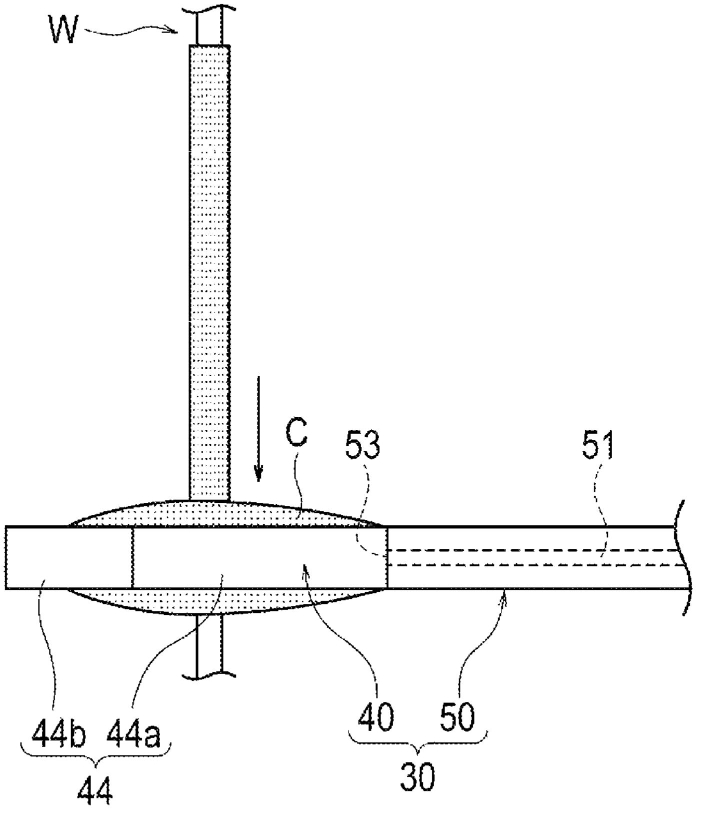
FIG. 9 is a view for explaining the coating method according to the embodiment.

As illustrated in FIG. 9, in a state where the shaft W has been disposed in the holding portion 41, the control unit, through operation by the operator, relatively moves the nozzle 30 along the axis (axial) direction of the shaft W. That is, the nozzle 30 moves along the axial direction of the shaft W. Herein, the nozzle 30 is caused to move to the shaft W, however, the shaft W may be caused to move to the nozzle 30 or both of the nozzle 30 and the shaft W may be caused to move.

When the shaft W is disposed inside the holding portion 41, the coating liquid C is brought into contact with the shaft W in a state where the coating liquid C surrounds a circumferential direction of the shaft W (see FIG. 2). Accordingly, it is possible to prevent the coating liquid C from being unevenly applied to a part in the circumferential direction of the shaft W. Moreover, by moving the nozzle 30 in the axis direction of the shaft W in a state where the circumferential direction of the shaft W is surrounded by the coating liquid C, the coating liquid C can be applied over the entire circumferential direction of the shaft W within a range where the nozzle 30 has been caused to move. Accordingly, similar to a case where the shaft W is dip-coated with the coating liquid C, it is possible to apply the coating liquid C in the circumferential direction of the shaft W along the arbitrary or desired portion in the axis (axial) direction of the shaft W without inconsistencies.

As illustrated in FIG. 10, after having applied the coating liquid C over a predetermined range in the axial direction of the shaft W, the control unit, through operation by the operator, aspirates the surplus coating liquid C via the lumen 51 if necessary. That is the coating device may be operated to aspirate surplus coating liquid C via the lumen 51 (if needed). For example, in a case where the coating liquid C that excessively remains at an application completion position of the coating liquid C on the shaft W is present, the coating liquid C can be aspirated. Moreover, for example, when the nozzle 30 is caused to separate from the shaft W, by aspirating the coating liquid C held in the holding portion 41, it is possible to prevent the coating liquid C from excessively remaining at the application completion position of the coating liquid C on the shaft W. The aspiration of the coating liquid C can be conducted if necessary, and can be omitted as appropriate.

Figure 11:
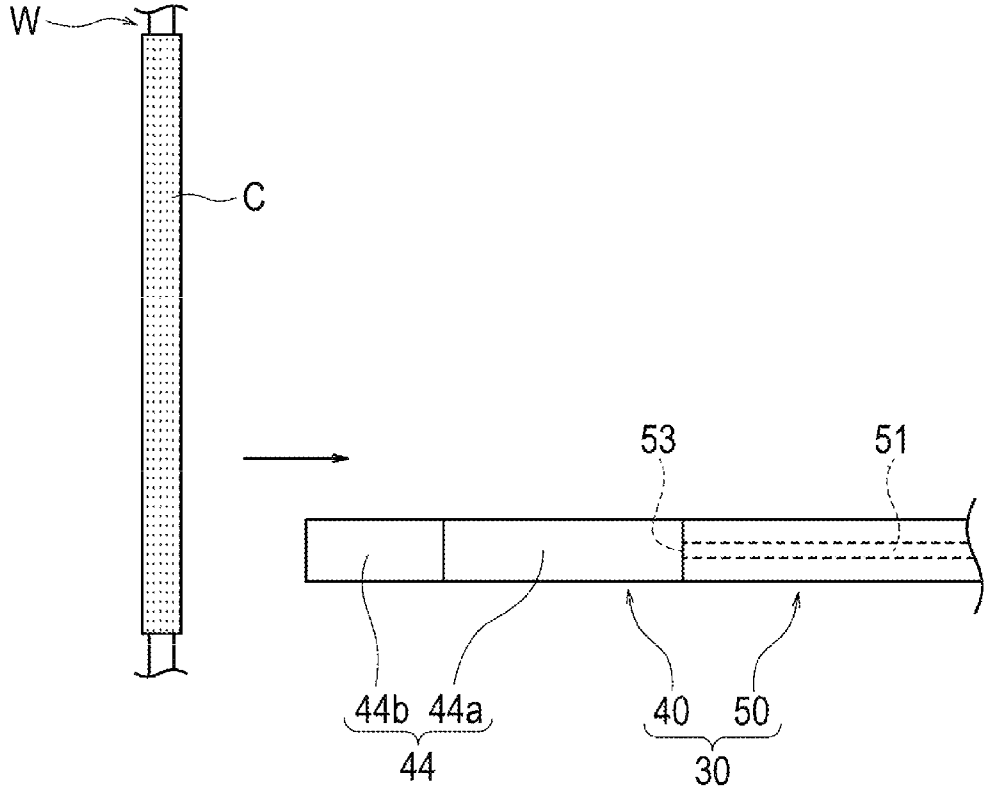
FIG. 11 is a view for explaining the coating method according to the embodiment.

As illustrated in FIG. 11, after having completely applied the coating liquid C to the shaft W, the control unit, through operation by the operator, causes the nozzle 30 to separate from or move away from the shaft W. That is, the nozzle 30 moves away from the shaft W. Herein, the nozzle 30 is caused to separate or move away from the shaft W, but the shaft W may be caused to separate from (move away from) the nozzle 30, or both the nozzle 30 and the shaft W may be caused to separate or move away from each other.

In a case where the shaft W includes a shaft of a catheter, a position in the shaft W at which the coating liquid C is applied can be set to a portion excluding a distal portion and a proximal portion of the shaft W. In a case where another shaft is welded to the shaft W, because the coating liquid C is not applied to the distal portion of the shaft W, it is possible to prevent the welding intensity from decreasing due to an influence by the coating liquid C. Moreover, in a case where another shaft is welded to the shaft W, because the coating liquid C is not applied to the proximal portion of the shaft W, it is possible to prevent the welding intensity of another shaft from decreasing due to an influence by the coating liquid C. Moreover, in a case where the coating liquid C is applied to a balloon catheter, for example, a balloon portion and a shaft portion of the balloon catheter can be coated by different methods. In this case, before or after the shaft portion is coated using the nozzle 30 or the coating device 10, the balloon portion is coated using dipping or spraying, and the balloon portion and the shaft portion coated by the respective methods can be welded to each other.

As in the foregoing, with the present embodiment, in a state where the coating liquid C has been held in the holding portion 41 (the holding space 41A) of the nozzle distal portion 40, the shaft W is disposed to the holding portion 41, and the nozzle 30 and the shaft W are caused to relatively move along the axis (axial) direction of the shaft W, so that it is possible to appropriately apply the coating liquid C to the desired portion in the axis direction of the shaft W. Accordingly, after the coating liquid C has been applied to the shaft W, work of removing the coating in a portion to which another member is welded from the shaft W becomes unnecessary. Therefore, it is possible to prevent the manufacturing work of the catheter from becoming cumbersome.

Moreover, the shaft W is disposed inside the holding portion 41, so that it is possible to dispose the coating liquid C so as to surround an outer circumference of the shaft W, and thus to prevent application inconsistencies in the circumferential direction of the shaft W from occurring. Accordingly, by applying the coating liquid C by using the nozzle 30, an effect similar to that by the dip-coating can be obtained, meanwhile, it becomes unnecessary to hold and manage a large amount of the coating liquid C, unlike the dip-coating. Therefore, it is possible to attain a reduction in the material cost, a reduction in an influence on health damage to the operator, a reduction in an environment load, and a reduction in a work burden that is required for the long-term management of the coating liquid.

<Modification Example of Nozzle Distal Portion>

Figure 12:
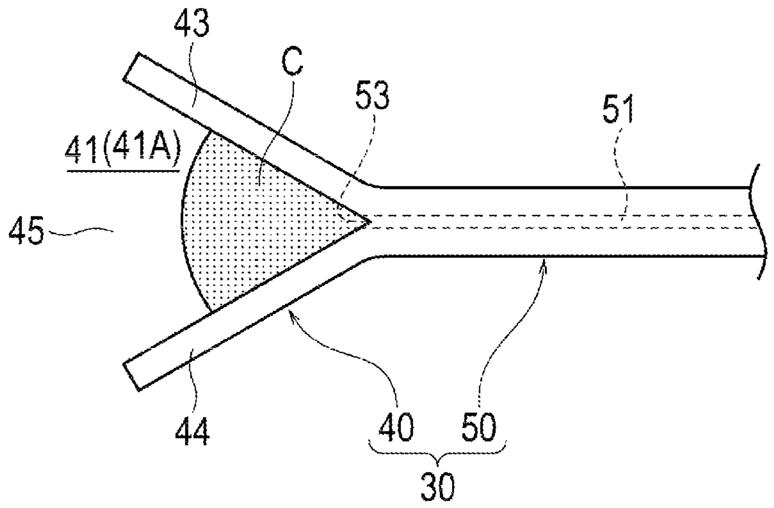
FIG. 12 is a plan view of a nozzle distal portion according to a modification example.
Figure 13:
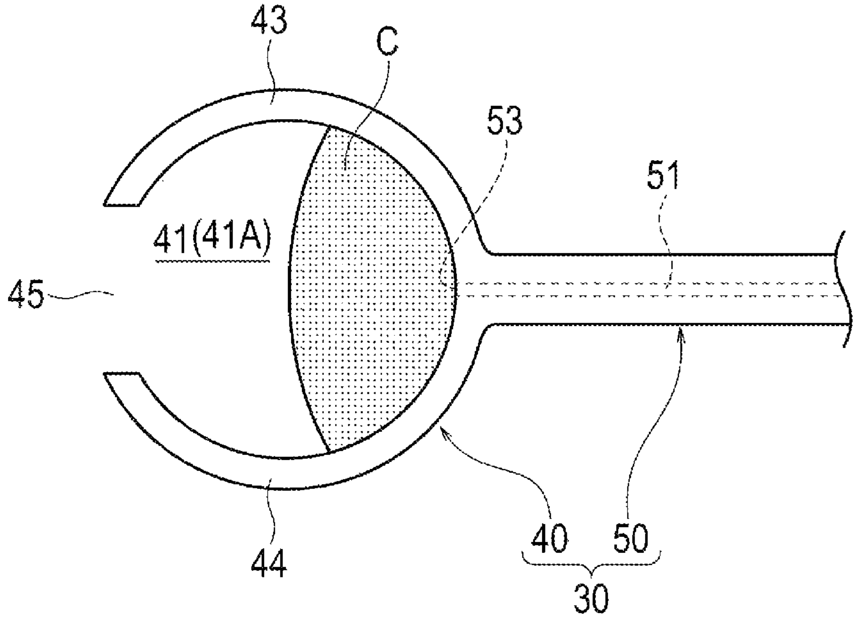
FIG. 13 is a plan view of a nozzle distal portion according to a modification example.
Figure 14:
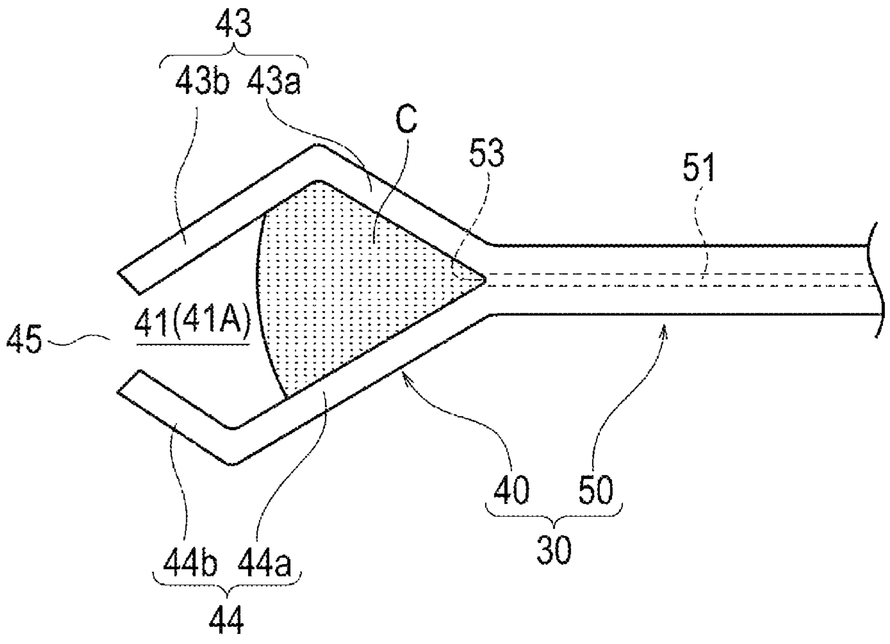
FIG. 14 is a plan view of a nozzle distal portion according to a modification example.

FIGS. 12 to 14 illustrate modification examples of the nozzle distal portion 40.

A specific shape of the nozzle distal portion 40 is not specially limited as long as the nozzle distal portion 40 includes the holding portion 41 (the holding space 41A) capable of holding the coating liquid C.

For example, as illustrated in FIG. 12, the nozzle distal portion 40 may have a planar shape of a substantially V-character shape. Moreover, for example, as illustrated in FIG. 13, the nozzle distal portion 40 may have a planar shape of a substantially C-character shape. Moreover, for example, as illustrated in FIG. 14, the nozzle distal portion 40 may have a geometric shape in which the respective bifurcated portions 43 and 44 are asymmetrical with each other. Moreover, for example, the nozzle distal portion 40 may have a planar shape of a substantially U-character shape.

Also in a case where the coating liquid C is applied using each of the nozzle distal portions 40 illustrated in the modification examples, in a state where the coating liquid C held in the holding portion 41 has been brought into contact with the shaft W, the nozzle 30 and the shaft W are caused to relatively move along the axis direction of the shaft W, so that it is possible to suitably apply the coating liquid C over an arbitrary or desired range in the axis or axial direction of the shaft W.

As in the foregoing, the nozzle, the coating device, and the coating method according to the present invention have been described based on the embodiment, however, the present invention is not limited to the embodiment and the modification examples described in the description, and various modifications are possible within the scope of the claims.

For example, the insertion portion that allows the insertion of the medical elongated body from the distal side of the nozzle distal portion into the holding portion does not need to be provided in the nozzle distal portion. With such a configuration, by causing the shaft to approach the nozzle distal portion from the up-and-down direction (axial direction) of the holding portion, it is possible to dispose the shaft inside the holding portion.

For example, the medical elongated body may be a member other than the shaft of the catheter. As one example, the nozzle, coating device and coating method can be applied to the application of a coating liquid (for example, a PTFE coating liquid) to an elongated medical device such as a guide wire. Moreover, applying the nozzle, coating device and coating method to various medical devices other than the guide wire is not specifically limited.

As long as the coating device is provided with a nozzle and a movement mechanism, the configuration, the arrangement, the control method, and the like of each mechanism are not specifically limited. That is, the detailed description above describes embodiments of the nozzle, coating device and coating method representing examples of the nozzle, coating device and coating method disclosed here. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents that fall within the scope of the claims are embraced by the claims.

REFERENCE SIGNS LIST

10 coating device
19*a* dispenser
19*b* tube
19*c* syringe
30 nozzle
40 nozzle distal portion
41 holding portion
41A holding space
43 first bifurcated portion
43*a* first part of first bifurcated portion
43*b* second part of first bifurcated portion
44 second bifurcated portion
44*a* first part of second bifurcated portion
44*b* second part of second bifurcated portion
45 insertion portion
50 nozzle main body portion
51 lumen
53 opening portion
110 movement mechanism
120 coating liquid supply mechanism
130 control unit
C coating liquid
W shaft (medical elongated body)

What is claimed is:

1. A nozzle comprising:

a nozzle distal portion including a holding space to hold a coating liquid to be applied to a medical elongated body;

a nozzle main body portion that possesses a distal end, the nozzle distal portion being located at the distal end of the nozzle main body, the nozzle main body portion including a lumen through which the coating liquid is delivered to the nozzle distal portion;

the nozzle main body portion including an opening via which the lumen and the holding space communicate with each other so that the coating liquid delivered through the lumen passes through the opening and enters the holding space;

the nozzle distal portion including a first bifurcated portion and a second bifurcated portion that are bifurcated at the distal end of the nozzle main body portion; and wherein each of the first bifurcated portion and the second bifurcated portion includes a first part that extends from the nozzle main body portion and possesses a distal end, and a second part that substantially linearly extends from the distal end of the first part, and the holding space being located between the first part and inner surfaces of the second part of the first and second bifurcated portions, and wherein the first parts of the first and second bifurcation portions extend symmetrically in directions that diverge away from each other, and the second parts of the first and second bifurcation portions extend parallel to each other.

2. The nozzle according to claim 1, wherein the nozzle main body portion possesses a proximal end opposite the distal end of the nozzle main body portion, the distal end of the nozzle main body portion being located closer to the holding space than the proximal end of the nozzle main body portion.

3. The nozzle according to claim 2, wherein the first bifurcated portion and the second bifurcated portion each include a distal end that is a free distal end, the free distal end of the first bifurcated portion and the free distal end of the second bifurcated portion being spaced apart from one another so that a space exists between the free distal end of the first bifurcated portion and the free distal end of the second bifurcated portion to allow insertion of the medical elongated body into the holding space from a distal side of the space.

4. The nozzle according to claim 1, wherein the nozzle distal portion includes an insertion portion that allows insertion of the medical elongated body into the holding space from a distal side of the nozzle distal portion.

5. The nozzle according to claim 1, wherein the coating liquid held in the holding space and the coating liquid applied to the medical elongated body is aspirated via the opening portion and the lumen of the nozzle main body portion.

6. A nozzle comprising:

a nozzle distal portion including a holding space to hold a coating liquid to be applied to a medical elongated body;

a nozzle main body portion that possesses a distal end, the nozzle distal portion being located at the distal end of the nozzle main body, the nozzle main body portion including a lumen through which the coating liquid is delivered to the nozzle distal portion;

the nozzle main body portion including an opening via which the lumen and the holding space communicate with each other so that the coating liquid delivered through the lumen passes through the opening and enters the holding space; and wherein nozzle main body portion includes a distal end portion that extends in an extending direction, the nozzle distal portion including first and second spaced apart portions that project distally away from the nozzle main body portion, each of the first and second spaced apart portions terminating in a distal end that is a free end, the first portion having an intermediate point that is between the free end of the first portion and the distal end of the nozzle main body portion, the second portion having an intermediate point that is between the free end of the second portion and the distal end of the nozzle main body portion, a distance between the free ends of the first and second portions of the nozzle distal portion in a direction perpendicular to the extending direction being less than a distance between the intermediate point of the first portion of the nozzle distal portion and the intermediate point of the second portion of the nozzle distal portion in the direction perpendicular to the extending direction.

7. A coating device for coating a medical elongated body comprising:

a nozzle comprised of a nozzle main body portion and a nozzle distal portion, the nozzle main body portion possessing a distal end at which is located the nozzle distal portion, the nozzle distal portion being located at the distal end of the nozzle main body, the nozzle distal portion including a holding space to hold a coating liquid to be applied to the medical elongated body that extends in an axial direction, the nozzle main body portion including a lumen through which the coating liquid is delivered to the nozzle distal portion, and the nozzle main body portion including an opening portion that communicates with the lumen and opens into the holding space, the nozzle distal portion includes two spaced apart portions that project in a distal direction away from the nozzle main body portion, each of the two spaced apart portions include a bifurcation portion and a linearly extending portion, the bifurcations portions symmetrically extending in a direction that diverges away from one another and the linearly extending portions extending substantially parallel to one another, and wherein the holding space is between the two spaced apart portions and an inner surface of the linearly extending portion of the two spaced apart portions; and an actuator that controls movement of the nozzle and/or the medical elongated body so that the coating liquid is applied to an axial portion of the medical elongated body by relatively moving, in a state where a part of the medical elongated body is disposed in the holding space, the nozzle and the medical elongated body along the axial direction of the medical elongated body.

8. The coating device according to claim 7, further comprising:

an opening of the nozzle main body portion opening into the part of the holding space bordered by the two spaced apart portions of the nozzle distal portion.

9. The coating device according to claim 7, wherein the two spaced apart portions each having a free end, the free end of the two spaced apart portions being spaced from one another to define an insertion opening through which is insertable the medical elongated body to allow the medical elongated body to be inserted into the holding space, the insertion opening being located distal of the opening.

10. The coating device according to claim 7, wherein the actuator that controls movement of the nozzle and/or the medical elongated body moves the nozzle in an up-and-down direction as the nozzle coats the medical elongated body.

* * * * *